(12) United States Patent
Halbrook et al.

(10) Patent No.: US 10,325,233 B2
(45) Date of Patent: Jun. 18, 2019

(54) SYSTEMS AND METHODS FOR REPLENISHMENT IN A FREIGHT TETHERING ENVIRONMENT

(71) Applicant: Walmart Apollo, LLC, Bentonville, AR (US)

(72) Inventors: Courtland Halbrook, Centerton, AR (US); John L. Sokolsky, Rogers, AR (US); Lara Shock, Bentonville, AR (US); Jeremy Wales, Rogers, AR (US); Joseph Hendricks, Bella Vista, AR (US); Terry Clear, Centerton, AR (US); Marv Hansen, Bella Vista, AR (US); Steve Ormon, Bentonville, AR (US); Cliff Parks, Bella Vista, AR (US)

(73) Assignee: Walmart Apollo, LLC, Bentonville, AR (US)

(*) Notice: Subject to any disclaimer, the term of this patent is extended or adjusted under 35 U.S.C. 154(b) by 554 days.

(21) Appl. No.: 15/069,501

(22) Filed: Mar. 14, 2016

(65) Prior Publication Data
US 2016/0275428 A1  Sep. 22, 2016

Related U.S. Application Data

(60) Provisional application No. 62/134,927, filed on Mar. 18, 2015.

(51) Int. Cl.
*G06Q 10/00* (2012.01)
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC ............................................ G06Q 10/00–50/00
(Continued)

(56) References Cited

U.S. PATENT DOCUMENTS 7,139,721 B2    11/2006 Borders et al.
7,363,249 B1 *   4/2008 Boesjes ............... G06Q 10/087
                                                       705/26.81
(Continued)

OTHER PUBLICATIONS

Greasley, Andrew, and Anand Assi. "Improving 'last mile' delivery performance to retailers in hub and spoke distribution systems." Journal of Manufacturing Technology Management 23.6 (2012): 794-805. (Year: 2012).*

(Continued)

*Primary Examiner* — Alan S Miller
(74) *Attorney, Agent, or Firm* — McCarter & English, LLP; David R. Burns (57) ABSTRACT

Systems, methods, and machine readable medium are provided for replenishing product in a freight tethering environment. A pick list is generated at a hub store including one or more items that need to be replenished at a spoke store. It is determined whether the pick list can be fulfilled by the hub store. If the pick list cannot be fulfilled by the hub store, then the one or more items on the pick list is aggregated to a replenishment need of the hub store. The aggregated replenishment need of the hub store and the spoke store is communicated to a distribution center. Product is received from the distribution center based on the aggregated replenishment need, and the pick list for the spoke store is fulfilled from the received product.

17 Claims, 6 Drawing Sheets (58) Field of Classification Search
USPC .............................................. 705/7.11–7.42
See application file for complete search history.

(56) References Cited

U.S. PATENT DOCUMENTS

| | | | | |
|---|---|---|---|---|
| 7,499,871 | B1* | 3/2009 | McBrayer | G06Q 10/063 705/7.13 |
| 7,552,066 | B1 | 6/2009 | Landvater | |
| 7,574,383 | B1* | 8/2009 | Parasnis | G06Q 10/06315 705/28 |
| 7,711,613 | B2 | 5/2010 | Ogawa et al. | |
| 7,848,953 | B2* | 12/2010 | Kahlon | G06Q 10/08 705/22 |
| 8,001,017 | B1* | 8/2011 | Franco | G06Q 10/08 705/26.1 |
| 8,090,630 | B2* | 1/2012 | Narayanan | G06Q 10/06 705/28 |
| 8,103,538 | B2* | 1/2012 | Bamberg | G06Q 10/087 705/7.31 |
| 8,311,902 | B2* | 11/2012 | Mountz | G06Q 10/087 700/213 |
| 8,527,373 | B1 | 9/2013 | Ricci et al. | |
| 9,626,646 | B1* | 4/2017 | Ettl | G06Q 10/087 |
| 9,779,375 | B2* | 10/2017 | Grabovski | G06Q 10/06311 |
| 2002/0049622 | A1* | 4/2002 | Lettich | G06Q 10/063 705/7.11 |
| 2002/0133387 | A1* | 9/2002 | Wilson | G06Q 10/0631 705/338 |
| 2002/0138358 | A1* | 9/2002 | Scheer | G06Q 10/063 705/7.36 |
| 2002/0143598 | A1* | 10/2002 | Scheer | G06Q 10/06 705/7.26 |
| 2002/0143669 | A1* | 10/2002 | Scheer | G06Q 10/087 705/28 |
| 2003/0014270 | A1* | 1/2003 | Qureshi | G06Q 10/08 705/26.1 |
| 2003/0093388 | A1* | 5/2003 | Albright | G06Q 10/08 705/400 |
| 2003/0177072 | A1 | 9/2003 | Bared | |
| 2003/0200148 | A1* | 10/2003 | Razumov | G06Q 10/0637 705/7.36 |
| 2003/0212602 | A1* | 11/2003 | Schaller | G06Q 10/087 705/22 |
| 2004/0098296 | A1* | 5/2004 | Bamberg | G06Q 10/087 705/7.31 |
| 2005/0256787 | A1* | 11/2005 | Wadawadigi | G06Q 10/087 705/28 |
| 2007/0244765 | A1* | 10/2007 | Hunter | G06Q 10/087 705/26.81 |
| 2008/0015943 | A1* | 1/2008 | Kahlon | G06Q 10/08 705/22 |
| 2009/0222129 | A1* | 9/2009 | Waddington | G06Q 10/06 700/216 |
| 2010/0138037 | A1 | 6/2010 | Adelberg et al. | |
| 2011/0225023 | A1 | 9/2011 | Evens et al. | |
| 2012/0303154 | A1 | 11/2012 | Stiernagle | |
| 2014/0278627 | A1* | 9/2014 | Grabovski | G06Q 10/06316 705/7.13 |
| 2016/0078523 | A1* | 3/2016 | Lopez | G06Q 30/0635 705/26.81 |

OTHER PUBLICATIONS

Hyatt, David. "Walmart's Sustainability Journey: Elizabeth Fretheim and the Search for Sustainable Trucking." (2014). (Year: 2014).*
Stephan, Konrad, and Nils Boysen. "Cross-docking." Journal of Management Control 22.1 (2011): 129. (Year: 2011).*
Lee, Hau L. "Aligning supply chain strategies with product uncertainties." California management review 44.3 (2002): 105-119. (Year: 2002).*
Lembke, Ron "Forecasting with Seasonality" (2015). http://business.unr.edu/faculty/ronlembke/handouts/Seasonality%20Final17.pdf (Year: 2015).*
Vinculum, "Vin eRetailTM—Store Inventory Management," accessible at www.vinculumgroup.com/store-inventory-management.html. Retreived Mar. 2, 2015.
Yashpal Ghate, "Distribution Management," accessible at www.slideshare.net/yashpalsg/distribution-strategies-with-case-study. Published Sep. 29, 2012.

* cited by examiner

Pick List for Spoke Store 6180 - ATLANTA GA - 03/10/2015

Grocery

Completed by: _______

| Temp | Category | Item # | UPC | PLU | Item Description | Pick Type (ea/lb) | Qty Needed to Pick (Target) | Actual Qty Picked | Actual Weight Picked |
|---|---|---|---|---|---|---|---|---|---|
| AMBIENT | BAG PASTA | 92236493 | 7874228037 | 0 | GV SPAGHETTI | EA | 5 | | |
| AMBIENT | BAG PASTA | 92267031 | 7874228867 | 0 | GV GARDEN ROTINI | EA | 3 | | |
| AMBIENT | CAN MEATS | 5510380047 | 8666057033R | 0 | BB BBQ CHIX SALAD | EA | 5 | | |
| AMBIENT | CAN MEATS | 5535396379 | 4717086510 | 0 | BUTTERFIELD 5OZ HAM | EA | 5 | | |
| AMBIENT | CAN MEATS | 5517095796 | 1700680946 | 0 | ARMR POTTED MEAT | EA | 11 | | |
| AMBIENT | CAN MEATS | 92399975 | 1700819646 | 0 | ARMR CHKN VIENNA SSG | EA | 5 | | |
| AMBIENT | CAN MEATS | 92176588 | 8660870310 | 0 | HB RTE HAM SALAD | EA | 5 | | |
| AMBIENT | CAN MEATS | 92199638 | 4720080031 | 0 | UNDERWOOD CHKN SPRD | EA | 3 | | |
| AMBIENT | CAN VEGETABLES | 5515588484 | 3710818902 | 0 | LIBBY PEAS 4 OZ | EA | 2 | | |
| AMBIENT | CAN VEGETABLES | 92055502 | 7874236943 | 0 | GV CUT GREEN BEANS | EA | 3 | | |
| AMBIENT | CAN VEGETABLES | 92055516 | 7874236934 | 0 | GV CUT GREEN BEANS | EA | 1 | | |
| AMBIENT | CAN VEGETABLES | 5516693844 | 7874228899 | 0 | GV MIXED VEG MEDLEY | EA | 4 | | |
| AMBIENT | CAN VEGETABLES | 92276678 | 7874210868 | 0 | GV SWEET PEAS | EA | 4 | | |

SYSTEMS AND METHODS FOR REPLENISHMENT IN A FREIGHT TETHERING ENVIRONMENT

RELATED APPLICATION

This application claims priority to U.S. Provisional Patent Application No. 62/134,927 entitled "Systems and Methods for Replenishment in a Freight Tethering Environment," filed on Mar. 18, 2015, which is hereby incorporated by reference in its entirety.

BACKGROUND

Many customers make quick trips to a store to buy certain items that are urgently needed or that need to be restocked often. For such quick trips, many customers prefer to go to a smaller store to avoid crowds and long checkout lanes often associated with a retailer or wholesaler's larger format stores. Smaller stores often have limited amount of inventory on-hand and sometimes need to replenish the inventory urgently. Larger stores have large backroom space to store inventory and can be replenished with large quantities of inventory via a distribution center. Traditionally, smaller stores are also replenished by a distribution center.

BRIEF DESCRIPTION OF THE DRAWINGS

The foregoing and other features and advantages provided by the present disclosure will be more fully understood from the following description of exemplary embodiments when read together with the accompanying drawings, in which.

DETAILED DESCRIPTION

Systems, methods, and computer readable mediums are described for freight tethering environments. Example embodiments provide for freight replenishment between hub and spoke stores, and for distributed freight tethering.

The logistics associated with store replenishment can result in an inefficient use of resources and product distribution. Conventionally, stores of all sizes associated with a retailer or wholesaler have been replenished by distribution centers, which often required strategic placement of large distribution centers throughout a geographic region to ensure that the distribution centers could replenish all stores within a geographic region. Typically, distribution centers distribute product based on an allowable minimum quantity for the specific product. For example, if a store wishes to carry limes, the store may be required to order at least 200 limes. This may be convenient for larger stores having a high volume of customers such that a majority of limes will sell through before they are no longer saleable, but for smaller stores that do not have high enough purchase rate, the small store must either not carry the product or must carry the product knowing that they may absorb the costs associated with unsaleable products. Furthermore, the smaller stores may not have enough shelf or storage space to accommodate the minimum quantity of items that can be shipped by the distribution center. While the above example, is provided to illustrate one inefficiency associated with conventional distribution models, those skilled in the art will recognize that other inefficiencies exist and are advantageously overcome by employing exemplary embodiments of the present disclosure.

To overcome limitations associated with conventional distribution models, rather than using a distribution center to replenish smaller stores, exemplary embodiments of the freight tethering environment described herein use a larger store to replenish the smaller stores. In some embodiments, the smaller stores are tethered to a larger store such that all products in the smaller stores are replenished from the larger store. This leverages the large storage space available at the larger store, and provides fresher product to the smaller store from a near-by larger store. For description purposes, the larger store is referred to herein as a hub store, and the smaller stores is referred to herein as spoke stores.

In some embodiments, the hub store may be a large format store or a supercenter store that has large storage space, large backroom space, and/or a large sales floor, and is capable of storing large amount of inventory and keeping large amount of inventory on-hand. In some embodiments, the spoke stores may be a small format store, such as convenience stores or rural stores, with limited amount of storage space and/or sales floor space, and are capable of keeping only enough inventory to fulfill customer demand for a day or two (or even for a few hours). A hub store may be associated with or tethered to one or more spoke stores based on various factors, such as, distance between hub store and spoke store, inventory needs of the spoke stores, and the like.

In some embodiments of the freight tethering environment, the point-of-sale (POS) systems of a spoke store are tied into the replenishment system of the hub store or are maintained as separate POS systems. In some embodiments, when the POS systems of a spoke store is tied to the POS systems of the hub store, the POS systems of the spoke store are treated as additional POS systems at the hub store or are treated as a separate department of the hub store. Tying the POS systems of the spoke store with the POS systems of the hub store allows for tracking of sales data for items sold throughout the day and year, and tracking replenishment needs.

In some embodiments, items at the spoke stores are selectively replenished by the hub store. For example, only some items at the spoke stores are replenished by the hub store based on certain factors, including but not limited to, history of high markdowns for an item, low turnover rate of an item, high inventory of an item in the hub store backroom, seasonal demands of an item, and the like. The spoke stores are replenished based on sales forecast and a presentation metric. A sales forecast for a product sold at a spoke store may be calculated based on sales data collected from POS systems at the spoke store and a rate of sale for an item at the spoke store. A presentation metric is determined based on the capacity of a module that displays the item to indicate a quantity of products that can be displayed in a store or in an area of a store.

In an example embodiment, the freight tethering environment employs two methods of replenishment—a push method and a pull method. In the push method, a spoke store is replenished to replace the product that was sold the day before. In the pull method, a spoke store is replenished to provide product that the store will sell tomorrow or in the future.

In the push method, replenishment of the spoke store is based on items sold during the day. The sales data related to the items sold is provided by the POS systems. In the pull method, replenishment of the spoke store is based on a forecast sale of items. The forecast is determined based on an average rate of sale for an item over a year, a seasonal profile of an item, an amount of the item expected to be sold in the next few weeks, a lead time for delivery of the item to the spoke store, and the like. A seasonal profile of an item refers to the peaks and valleys of a rate of sale for an item over a year. In some embodiments, the forecasted sale of items for a spoke store is aggregated to the forecasted sale of items for the hub store. This aggregated amount, which represents a replenishment need for both the spoke and hub store, is provided to a distribution center for fulfillment. The distribution center provides the inventory based on the aggregated amount to the hub store. The hub store is responsible for assembling and providing the appropriate amount of inventory to the spoke store based on the spoke store's forecasted sale of items. In some embodiments of the freight tethering environment, the distribution center may not receive a replenishment need from a spoke store.

The following description is presented to enable any person skilled in the art to create and use a computer system configuration and related method and systems to coordinate product replenishment for multiple stores in response to separately generated replenishment signals from separate store-specific computing systems. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. Thus, the present disclosure is not intended to be limited to the embodiments shown, but is to be accorded the widest scope consistent with the principles and features disclosed herein.

Figure 1:
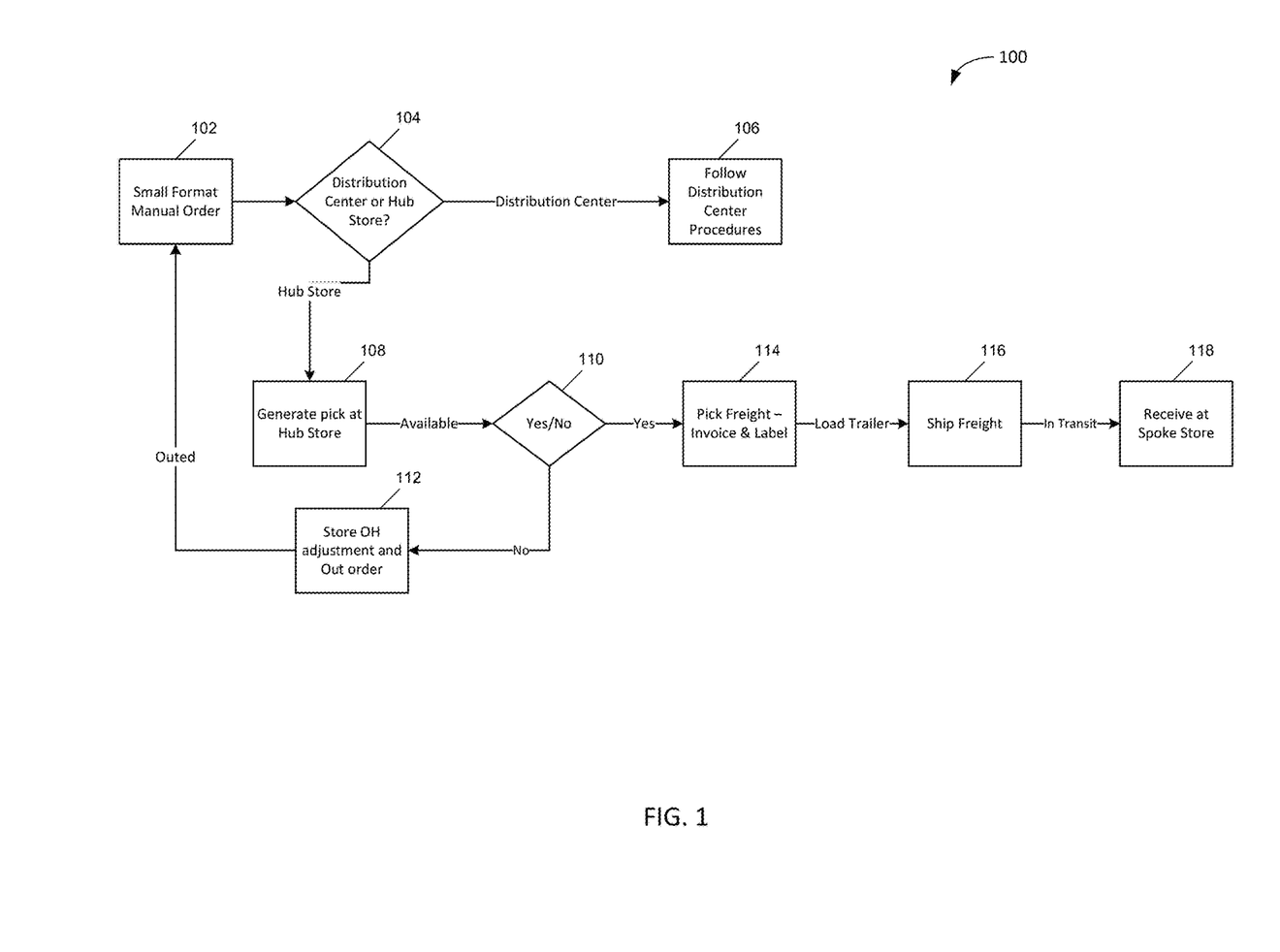
FIG. 1 is a flowchart illustrating an exemplary method for replenishing a store in a freight tethering environment, according to example embodiments.

FIG. 1 is a flowchart illustrating an exemplary (push) method 100 for replenishing a store in a freight tethering environment, according to an example embodiment.

At block 102, a spoke store enters a replenishment order for one or more items into a replenishment system via a spoke store computing system including at least a computing device (e.g., a store server). At block 104, the replenishment system determines whether an item on the order is fulfilled by a distribution center or a hub store. In one embodiment, the spoke store computing system specifies the location from which an item in the order is fulfilled—distribution center or hub store. In another embodiment, the replenishment system is programmed to automatically recognize how an item is replenished. For example, a specific item like tomatoes may be programmed to be fulfilled by a hub store, while a specific item like frozen peas may be programmed to be fulfilled by a distribution center. As another example, a type of item, such as fresh produce, may be programmed to be fulfilled by a hub store, while frozen produce may be programmed to be fulfilled by a distribution center. In some embodiments, some of the items in the replenishment order can be fulfilled by a hub store and other items can be fulfilled by a distribution center. In this manner, the replenishment order can be spilt or divided based on how the items can be fulfilled. In some embodiments, the replenishment order is not spilt and the entire order is handled by the hub store or the distribution center.

At block 104, if it is determined that the item is fulfilled by a distribution center, then the method proceeds to block 106. At block 106, the replenishment order is transmitted to a distribution center computing system and distribution center procedures are followed to fulfill the order.

At block 104, if it is determined that the item is fulfilled by a hub store, then the method proceeds to block 108. At block 108, a hub store computing system receives a transmission from the spoke store computing system that includes the replenishment order, and the hub store computing system generates a pick list for the hub store based on the replenishment order received from the spoke store. The pick list is outputted or displayed by the hub store computing system on a display device at the hub store to facilitate fulfillment of the pick list by the hub store The pick list can be a list that includes an item description, a quantity of item to be picked, a department name, an item number, a universal product code (UPC), a price look-up code (PLU), a storage temperature for an item, an item category, a pick type (number of units versus weight) and the like. At block 110, the hub store computing system determines whether the item is available for fulfillment. In some embodiments, an associate at the hub store determines whether an item on the pick list is available for fulfillment based on inventory levels at the hub store and replenishment needs of the hub store. The inventory information and replenishment needs of the hub store may be provided by other systems that track inventory and forecast replenishment needs. For example, the hub store computing system can maintain an inventory database that includes inventory information for items in the hub store, and the hub store computing system can create one or more queries to retrieve the inventory information for the items included in the replenishment order.

If it is determined that the item is not available at the hub store for replenishment, then the method proceeds to block 112. At block 112, the information related to inventory on-hand for the hub store is adjusted via the hub store computing system, and the spoke store is informed that the item is not in stock at the hub store (e.g., the hub store computing system can transmit a message to the spoke store computing system indicating that the item is out-of-stock). Since, the hub store is out of the item, the hub store inventory is appropriately adjusted. The hub store computing system communicates to the spoke store computing system that the spoke store will not be receiving the item since the hub store is out.

If it is determined that the item is available at the hub store for replenishment, the method proceeds to block 114. At block 114, the pick list is fulfilled by an associate. An associate collects the items on the pick list either from a backroom storage or from the shelves at the hub store. The associate also generates an invoice and label for the items on the pick list via the hub store computing system. At block 116, the items are loaded on a trailer and transported to the spoke store. At block 118, the spoke store receives the items.

In some embodiments, a merchandise transfer request (MTR) process is also implemented at block 114. The MTR process ensures inventory updates in a timely manner via the hub store computing system and/or the spoke store computing system (e.g., by updating and/or modifying inventory databases), and facilitates financial accounting for the inventory transfer from a hub store to a spoke store. The MTR process can decrement the inventory in an inventory database associated with the hub store, and can increment the inventory in an inventory database associated with the spoke store. An associate at the hub store fulfilling the pick list enters the quantity and total weight of each item that is collected based on the pick list. The associate at the spoke store receiving the items validates the received items and signs-off on the invoice. In this manner, the hub store associate is responsible for tracking inventory, and the spoke store associate can easily verify the order.

In some embodiments, an associate may fulfill a lesser quantity of an item than generated on the pick list due to the inventory available at the hub store. In this case, the associate may take into account the replenishment needs of the hub store before fulfilling the quantity of item on the pick list. In some embodiments, the hub store computing system can be programmed to determine the lesser quantity (e.g., based on inventory information and sales forecast information) and to annotate the pick list with the lesser quantity to indicate to the associate that a lesser quantity then requested should be transferred from the hub store to the spoke store.

Additionally, exemplary embodiments of the replenishment system can be programmed to prevent sending an item from a hub store to the spoke store if the spoke store does not generally stock or regularly sell the item. For example, the replenishment system may include a list of products that a spoke store sells, and if the hub store picks an item to transport to the spoke store that it does not sell, then an error message may be displayed via the hub store computing system. In another embodiment, the replenishment system may be programmed so that the pick list cannot include an item that the spoke store does not sell such that any attempt to add such an item to the replenishment order via the spoke store computing system can be rejected or denied. In some embodiments, if a spoke store wants to order an item that it does not sell, a special request can be generated by the spoke store computing system so that the item is placed on a temporary order.

In this push-type method, a spoke store can place an order for one or more items as necessary to replenish its inventory via the spoke store computing system and based on inventory information (e.g., maintained in an inventory database associated with the spoke store). The order is fulfilled by a hub store or a distribution center.

Figure 2:
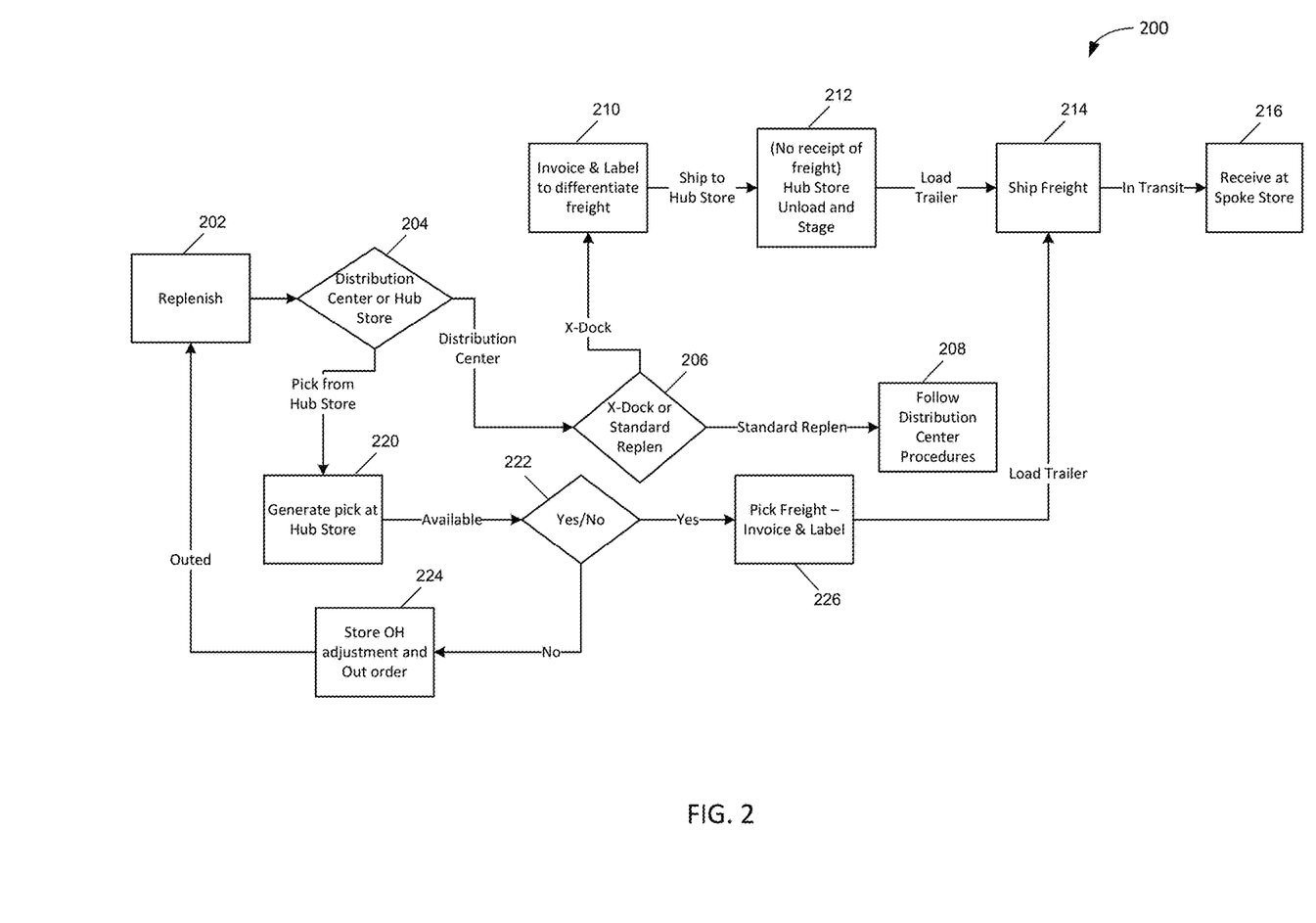
FIG. 2 is a flowchart illustrating another exemplary method for replenishing a store in a freight tethering environment, according to example embodiments.

FIG. 2 is a flowchart illustrating an exemplary (pull) method 200 for replenishing a store in a freight tethering environment, according to an example embodiment. The pull method is automatic replenishment for a spoke store, while the push method provides for replenishment at the request of the spoke store, e.g., based on current or past sales. The pull method uses forecasting information to determine replenishment needs of the spoke store.

At block 202, the hub store computing system begins the automatic replenishment process for one or more items that need to be replenished at a spoke store based on, e.g., a forecast of the spoke stores future needs. In some embodiments, the spoke store computing system can generate the forecast for the spoke store and transmit the forecast to the hub store computing system. In some embodiments, the hub store computing system can generate the forecast for the spoke store. At block 204, the hub store computing system determines whether an item is fulfilled by a distribution center or a hub store. In one embodiment, the spoke store computing system specifies where an item in the order is fulfilled—distribution center or hub store. In another embodiment, the hub store computing system is programmed to automatically recognize how an item is replenished.

At block 204, if it is determined that the item is fulfilled by a distribution center, then the method proceeds to block 206. At block 206, the replenishment order is transmitted to the distribution center computing system, and the distribution center computing system determines whether the items follow a standard replenishment process or a x-dock process. If the item follows a standard replenishment, the method continues to block 208. At block 208, the distribution center procedures are followed to fulfill the order. If the item follows a special fulfillment process, x-dock, then the method continues to block 210. At block 210, according to the special fulfillment process, invoices and labels are generated by the distribution center computing system to differentiate freight. The distribution center sorts the freight and labels the freight to indicate whether it should go to the hub store or the spoke store. The freight for both stores is shipped on the same trailer, and later the hub store is responsible for transporting the appropriate freight to the spoke store. Shipping freight for both hub store and spoke store to the hub store, and enabling the hub store to easily differentiate and ship the freight for the spoke store to the spoke store allows for savings in transportation costs.

The items are shipped to the hub store, and at block 212, the hub store unloads and assembles the items for transporting to the spoke store. In some embodiments, the hub store computing system does not receive an electronic receipt of the freight for the spoke store because that freight is not added to the hub store's inventory. At block 214, the items are loaded on a trailer and transported to the spoke store. At block 216, the spoke store receives the items.

At block 204, if it is determined that the item is fulfilled by a hub store, then the method proceeds to block 220. At block 220, the hub store computing system generates a pick list for the hub store based on the automatically generated replenishment order for the spoke store. The pick list is outputted or displayed by the hub store computing system on a display device at the hub store to facilitate fulfillment of the pick list by the hub store. At block 222, the hub store computing system determines whether the item is available at the hub store for fulfillment. In some embodiments, an associate at the hub store determines whether an item on the pick list is available for fulfillment based on inventory levels at the hub store and replenishment needs of the hub store. The inventory information and replenishment needs of the hub store may be provided by other systems that track inventory and forecast replenishment needs. For example, the hub store computing system can maintain an inventory database that includes inventory information for items in the hub store, and the hub store computing system can create one or more queries to retrieve the inventory information for the items included in the replenishment order.

If it is determined that the item is not available at the hub store for replenishment, then the method proceeds to block 224. At block 224, the information related to inventory on-hand for the hub store is adjusted, and the spoke store is informed that the item is out-of-stock. Since, the hub store is out of the item, the hub store inventory is appropriately adjusted via the hub store computing system. The hub store computing system communicates to the spoke store computing system that the spoke store will not be receiving the item since the hub store is out-of-stock.

If it is determined that the item is available at the hub store for replenishment, the method proceeds to block 226. At block 226, the pick list is fulfilled by an associate. An associate collects the items on the pick list either from a backroom storage or from the shelves at the hub store. The associate also generates an invoice and label for the items on the pick list via the hub store computing system. At block 214, the items are loaded on a trailer and transported to the spoke store. At block 216, the spoke store receives the items.

In some embodiments, a merchandise transfer request (MTR) process is also implemented at block 226. The MTR process ensures inventory updates in a timely manner via the hub store computing system and/or the spoke store computing system (e.g., by updating and/or modifying inventory databases), and facilitates financial accounting for the inventory transfer from a hub store to a spoke store. The MTR process can decrement the inventory in an inventory database associated with the hub store, and can increment the inventory in an inventory database associated with the spoke store. An associate at the hub store fulfilling the pick list enters the quantity and total weight of each item that is collected based on the pick list. The associate at the spoke store receiving the items validates the received items and signs-off on the invoice. In this manner, the hub store associate is responsible for tracking inventory, and the spoke store associate can easily verify the order.

In some embodiments, an associate may fulfill a lesser quantity of an item than generated on the pick list due to the inventory available at the hub store. In this case, the associate may take into account the replenishment needs of the hub store before fulfilling the quantity of item on the pick list. In some embodiments, the hub store computing system can be programmed to determine the lesser quantity (e.g., based on inventory information and forecast information) and to annotate the pick list with the lesser quantity to indicate to the associate that a lesser quantity then requested should be transferred from the hub store to the spoke store.

Additionally, exemplary embodiments of the replenishment system can be programmed to prevent sending an item from a hub store to the spoke store if the spoke store does not generally stock or regularly sell the item. For example, the replenishment system may include a list of products that a spoke store sells, and if the hub store picks an item to transport to the spoke store that it does not sell, then an error message may be displayed via the hub store computing system. In another embodiment, the replenishment system may be programmed so that the pick list cannot include an item that the spoke store does not sell such that any attempt to added such an item to the replenishment order via the spoke store computing system can be rejected or denied. In some embodiments, if a spoke store wants to order an item that it does not sell, a special request can be generated by the spoke store computing system so that the item is placed on a temporary order.

In this pull-type method, the spoke store is automatically replenished. A pick list is generated daily via the hub store computing system based on forecasted replenishment needs of the spoke store (determined from an inventory database or a sales database associated with the spoke store), and the spoke store can be replenished directly by a hub store or a distribution center.

Figure 3:
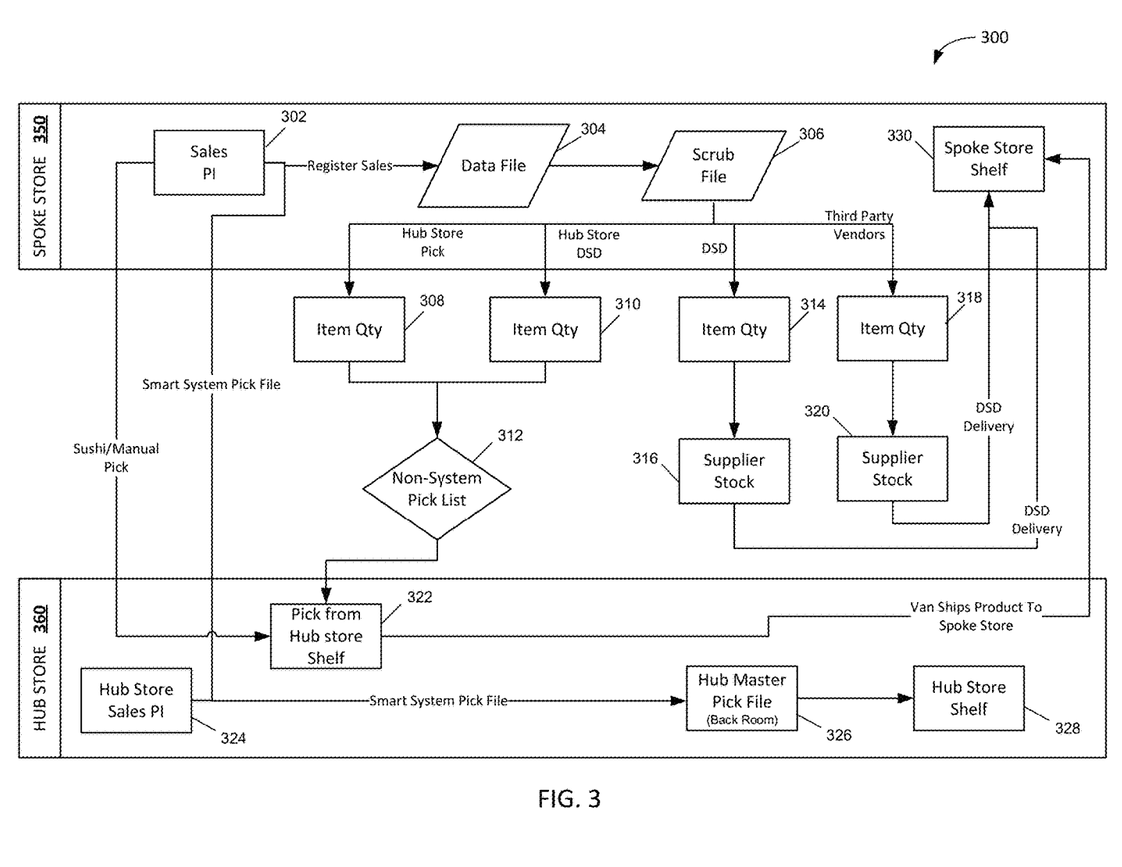
FIG. 3 is depicts an exemplary replenishment system in a freight tethering environment, according to example embodiments.

FIG. 3 depicts an exemplary replenishment system 300 in a freight tethering environment, according to example embodiments. The replenishment system 300 facilitates replenishment ordering in a freight tethering environment according to various embodiments described herein. In an example embodiment, the replenishment system 300 includes a spoke store computing system 350 and a hub store computing system 360. In other embodiments, the replenishment system 300 may also include other computing systems associated with a distribution center and a third party vendor.

At block 302, the spoke store computing systems calculates the sales perpetual inventory for a spoke store 350. In some cases, the perpetual inventory may be different than the actual inventory due to errors in accounting for inventory, misplaced items, stolen items, etc. A smart system pick file is generated by the replenishment system based on the perpetual inventory of the spoke store 350. In some embodiments, the spoke store computing system generates the smart system pick file. In other embodiments, the hub store computing system generates the smart system pick file. At block 304, the spoke store computing system creates a data file with data collected from the POS systems within the spoke store 350. The data file includes information related to item number, item description, distribution channel, register sales, modular capacity (a presentation metric), supplier number, supplier name, price look-up code (PLU), universal product code (UPC), storage temperature for the item, item category, on-hand inventory, etc. The different types of distribution channels include, but are not limited to, staple stock (product stored in the distribution center), assembly merchandise (product that flows from an inbound trailer directly to an outbound trailer without being entered as inventory at the distribution center computing system), and direct-store-delivery (product that supplier delivers directly to the store via methods other than trailer transportation). In some embodiments, at block 304, the spoke store computing system calculates a sales forecast for the spoke store for a period of time. For example, the sales forecast may be calculated for the next 13 weeks. In some embodiments, the hub store computing system calculates the sales forecast for the spoke store.

At block 306, the spoke store computing system processes the data file to generate a scrub file, in which POS data is analyzed and organized by item. The scrub file includes information related to item number, item description, quantity needed to be picked, channel, storage temperature for item, category, PLU, UPC, pick type (a number of package versus pounds), etc. An item may be replenished in multiple ways. The spoke store computing system processes the data file and identifies the replenishment method for each item. For example, an item may be replenished at the spoke store by a third-party vendor, by a hub store or by a distribution center. A hub store may fulfill an item by generating a pick list (the pick list may be generated by the spoke store computing system or the hub store computing system), or via a direct-store-delivery (DSD) process. In the DSD process, the hub store receives replenishment inventory for the spoke store from the distribution center, and the hub store transports it to the spoke store.

At block 306, the spoke store computing system also determines how each item is replenished. For example, a certain type of item is replenished by the hub store via a pick list at block 308. Other item types are replenished by the hub store via the DSD process at block 310. At block 312, a non-system pick list is generated based on the items to be replenished via the hub store pick list at block 308 and hub store DSD at block 310. The spoke store computing system transmits the non-system pick list to the hub store computing system 360.

Similarly, other item types are replenished by the distribution center via direct-store-delivery at block 314, and other item types are replenished by third-party vendors via direct-store-delivery at block 318. The spoke store computing system 350 communicates the items to be replenished via the distribution center DSD process to the supplier stock at block 316. At block 316, an associate gathers the items from the supplier stock and prepares them to be directly delivered to the spoke store. Similarly, the spoke store computing system 350 communicates the items to be replenished via the third-party vendor to the third-party vendor supplier stock at block 318. At block 318, an associate gathers the items from the supplier stock and prepares them to be directly delivered to the spoke store. Even though four methods of replenishment are described here, fewer or more methods of replenishment may be used in the replenishment system.

At block 322, an associate at the hub store 360 gathers product from the shelves of the hub store, and assembles them for delivery to the spoke store. At block 322, the associate gathers product based on the non-system pick list and a manual pick file. The manual pick file allows the associate to provide additional items to the spoke store that are not included on the system and non-system pick lists.

At block 324, the hub store computing system 360 calculates the perpetual inventory for the hub store. The hub store computing system 360 generates a smart system pick file is based on the perpetual inventory of the hub store 360. The hub store computing system aggregates the smart system pick file of the hub store 360 and the spoke store 350 and communicates it to the backroom facilities system at the hub store 360. At block 326, an associate in the backroom storage of the hub store gathers product based on the smart system pick file. At block 328, the associate prepares the appropriate items for replenishment of the shelves at the hub store, and prepares the appropriate items for delivery to the spoke store.

Figure 4:
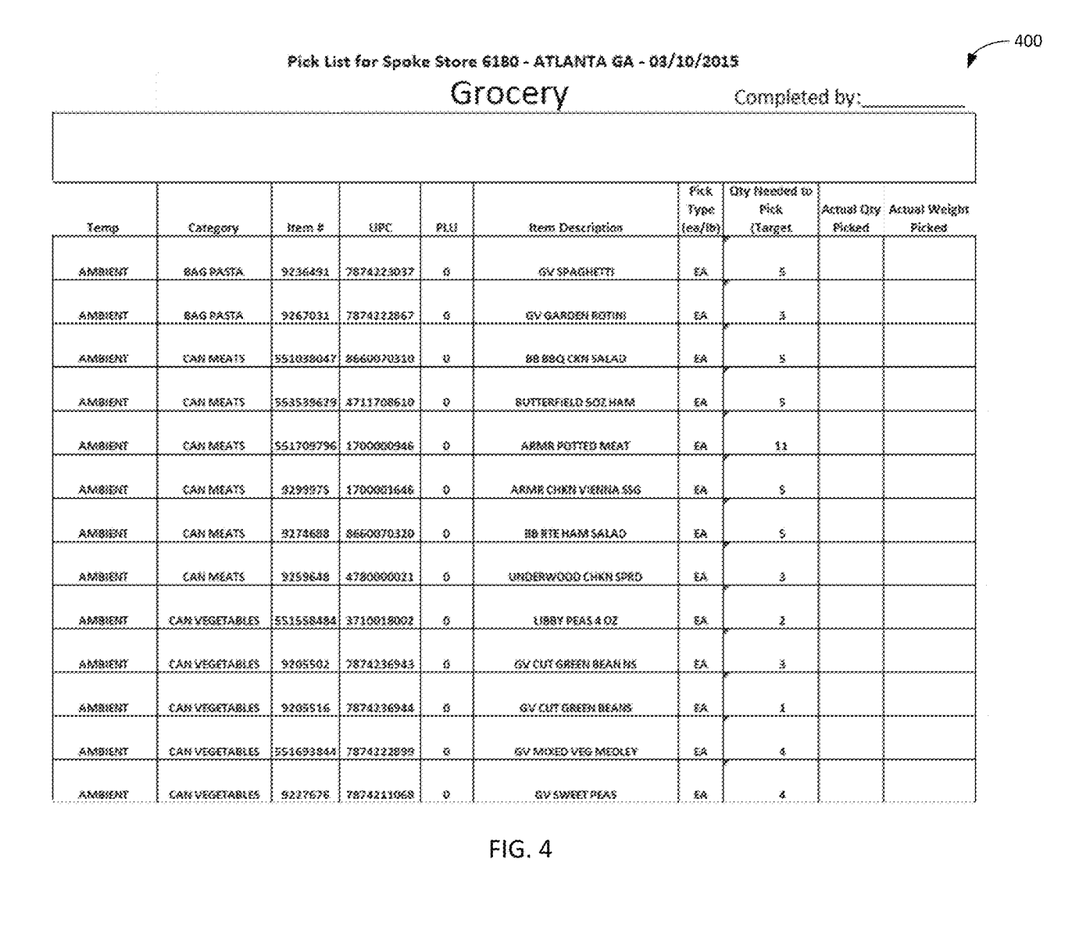
FIG. 4 depicts an exemplary pick list generated by a replenishment system of the freight tethering environment, according to example embodiments.

FIG. 4 depicts an exemplary pick list 400 generated by a replenishment system of the freight tethering environment, according to example embodiments. Pick list 400 is generated for spoke store #6180 in Atlanta, Ga. for Mar. 10, 2015. As shown, the pick list 400 includes an item description, a quantity of item, a department name, an item number, a UPC, a storage temperature for an item, an item category, and a pick type. The pick list 400 also includes space for an associate to enter information related to actual quantity picked and actual weight packed. As described above, a pick list may be generated daily for a spoke store, and it may be fulfilled daily by a hub store. In some embodiments, the pick list is communicated to an associate via email.

In this manner, a freight tethering environment facilitates replenishment of product at a spoke store via a hub store and a distribution center. There are many benefits of using inventory at a hub store to replenish inventory at a spoke store. One of them is a reduction in price markdowns for various items at both the hub store and spoke store. At the hub store, if inventory is high for a particular item, instead of employing a price markdown for that item, the hub store can use the high inventory to replenish a spoke store. Moreover, the spoke store need not keep high levels of inventory on-hand because it can replenish its inventory from a near-by hub store when needed. The system also allows for turning-off tethering to a spoke store if a high volume of items is detected at the spoke store. In some embodiments, this decision is made at the headquarters or home office of the retail stores. The system also takes into account a change in the presentation metric representing the capacity of the module that displays an item. Based on the season, an item may be in higher demand and therefore, the spoke store may employ a larger module to display a larger quantity of item for sale in the spoke store. The replenishment system described herein ensures that the spoke store has enough inventory to adequately fill the larger display module (so that the display does not appear empty), in addition to the amount of inventory required by the spoke store based on the sales forecast.

Figure 5:
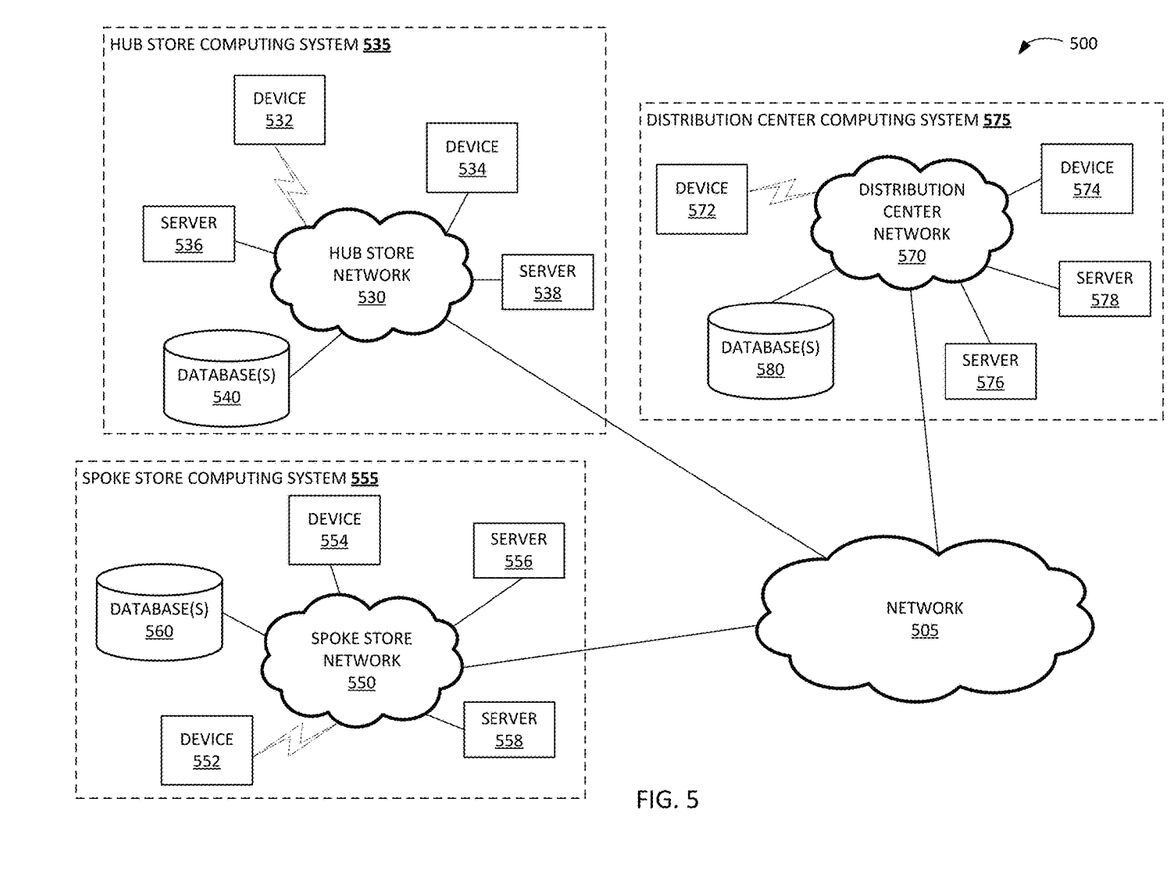
FIG. 5 is a diagram of an exemplary network environment suitable for a distributed implementation of exemplary embodiments.

FIG. 5 is a diagram of an exemplary network environment suitable for a distributed implementation of exemplary embodiments of a freight tethering environment 500. The environment 500 can include a network 505, and a hub store computing system 535 having a hub store network 530, a spoke store computing system 555 having a spoke store network 550 and a distribution center computing system 575 having a distribution center network 570 in communication with each other via network 505. The hub store computing system 535 can include multiple devices, for example, device 532, device 534, multiple servers, for example, server 536, server 538, and databases 540 in communication with the network 505 as well as the systems 555 and 575 via the hub store network 530. The spoke store computing system 555 can include multiple devices, for example, device 552, device 554, multiple servers, for example, server 556, server 558, and databases 560 in communication with the network 505 as well as the systems 535 and 575 via the spoke store network 550. The distribution center system 575 can include multiple devices, for example, device 572, device 574, multiple servers, for example server 576, server 578, and database 580 in communication with the network 505 as well as the systems 535 and 555 via the distribution center network 570.

One or more components of the replenishment system may be implemented in one or more devices 532, 534, 552, 554, 572, 574 of the freight tethering environment 500. In other embodiments, one or more of components of the replenishment system and the freight tethering environment may be included in one or more servers 536, 538, 556, 558, 576, 578 while other components of the replenishment system and the freight tethering environment are provided in devices 532, 534, 552, 554, 572, 574. The components of the replenishment system and the freight tethering environment may include various circuits, circuitry and one or more software components, programs, applications, apps or other units of software code base or instructions configured to be executed by one or more processors included in devices 532, 534, 552, 554, 572, 574 or server 536, 538, 556, 558, 576, 578.

In an example embodiment, one or more portions of network 505, hub store network 530, spoke store network 550, and distribution center network 570 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The devices 532, 534, 552, 554, 572, 574 may comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. Each of devices 532, 534, 552, 554, 572, 574 may connect to a network via a wired or wireless connection. Each of devices 532, 534, 552, 554, 572, 574, may include one or more applications such as, but not limited to, sales data application, inventory management application, replenishment system application, packaging and delivery application, and the like. In an example embodiment, the devices 532, 534, 552, 554, 572, 574 may perform all the functionalities described herein.

In some embodiments, the devices 532, 534 in communication with the hub store network 530, and the device 552, 554 in communication with the spoke store network 550 may be point-of-sale (POS) systems, and may comprise, but are not limited to, cash registers, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The devices 532, 534, 552, 554 being a POS system, may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

In some embodiments, the replenishment system may be included on the servers 536, 538, 556, 558, 576, 578, and the servers 536, 538, 556, 558, 576, 578 perform the functionalities described herein. In yet another embodiment, the devices 532, 534, 552, 554, 572, 574 may perform some of the functionalities, and servers 536, 538, 556, 558, 576, 578 perform the other functionalities described herein.

In an example embodiment, one or more of devices 532, 534 and servers 536, 538 are configured to perform the functionalities associated with the hub store computing system 535 described herein. One or more of devices 552, 554, and servers 556, 558 are configured to perform the functionalities associated with the spoke store computing system 555 described herein. Further, one or more of devices 572, 574 and servers 576, 578 are configured to perform the functionalities associated with the distribution center computing system 575 described herein. The databases 540 may be an inventory database or a sales information databases maintained by the hub store computing system 535 and may be associated with a hub store. The databases 560 may be an inventory database or a sales information database maintained by the spoke store computing system 555 and may be associated with a spoke store. The databases 580 may be an inventory database maintained by the distribution store computing system 575 and may be associated with a distribution center.

Each of the databases 540, 560, 580, and servers 536, 538, 556, 558, 576, 578 is connected to a network via a wired connection. Alternatively, one or more of the databases 540, 560, 580, and servers 536, 538, 556, 558, 576, 578 may be connected to a network via a wireless connection. Server 536, 538, 556, 558, 576, 578 comprise one or more computers or processors configured to communicate with devices 532, 534, 552, 554, 572, 574 via network 530, 550, or 570. Server 536, 538, 556, 558, 576, 578 may host one or more applications or websites accessed by devices 532, 534, 552, 554, 572, 574 and/or facilitates access to the content of databases 540, 560, 580. Databases 540, 560, 580 comprise one or more storage devices for storing data and/or instructions (or code) for use by server 536, 538, 556, 558, 576, 578, and/or devices 532, 534, 552, 554, 572, 574. Databases 540, 560, 580 and server 536, 538, 556, 558, 576, 578 may be located at one or more geographically distributed locations from each other or from devices 532, 534, 552, 554, 572, 574. Alternatively, databases 540, 560, 580 may be included within server 536, 538, 556, 558, 576, 578.

Figure 6:
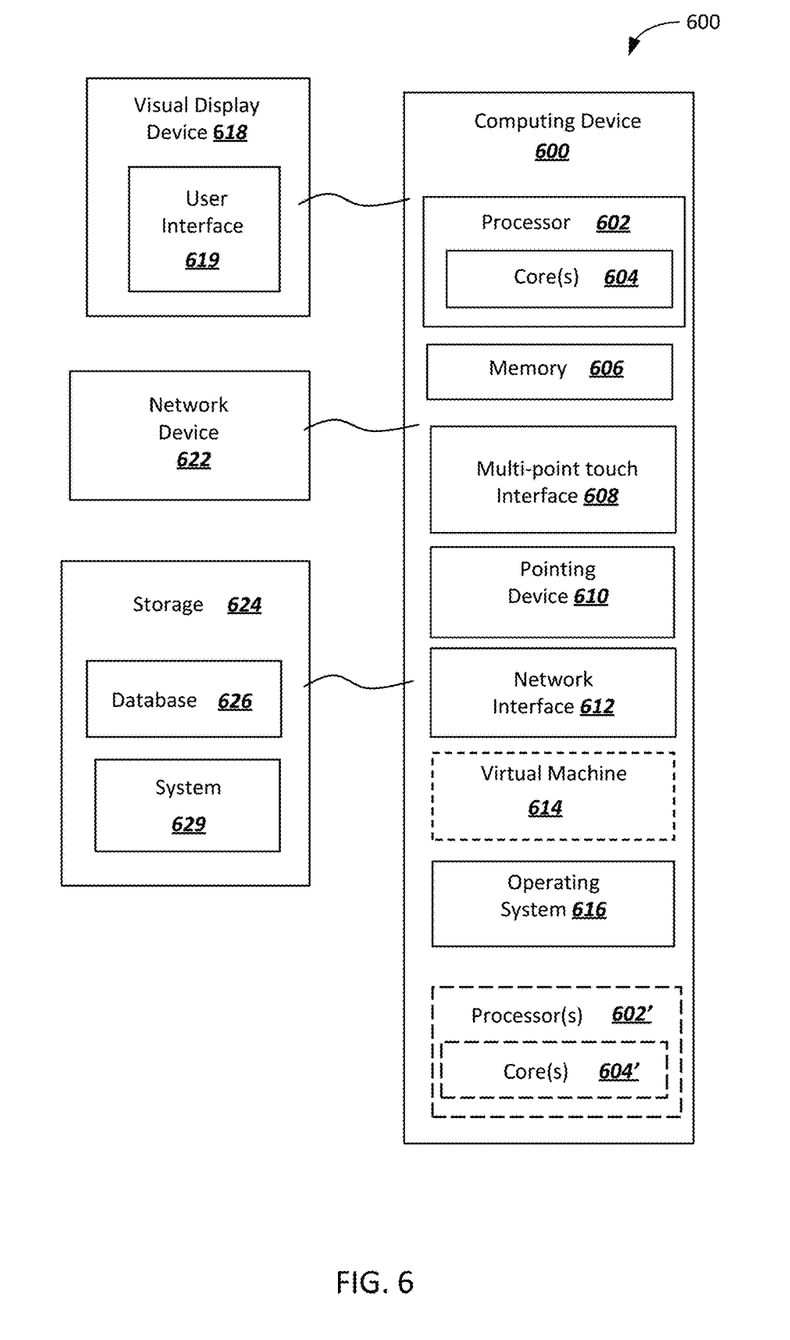
FIG. 6 is a block diagram of an exemplary computing device that may be used to implement exemplary embodiments of the freight tethering environment described herein.

FIG. 6 is a block diagram of an exemplary computing device 600 that can be used to perform any of the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor. Processor 602 and processor(s) 602' may be any of one or more processors included in the hub store computing system, the spoke store computing system, or the distribution center computing system.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof.

A user can interact with the computing device 600 through a visual display device 618, such as a touch screen display or computer monitor, which can display one or more user interfaces 619 that can be provided in accordance with exemplary embodiments. The visual display device 618 can also display other aspects, elements and/or information or data associated with exemplary embodiments, for example, inventory data, pick list file, and the like. The computing device 600 can include other I/O devices for receiving input from a user, for example, a keyboard or any suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

The computing device 600 can also include one or more storage devices 624, such as a hard-drive, CD-ROM, or other computer readable media, for storing data and computer-readable instructions and/or software, such as the system 629 that implements exemplary embodiments of the freight tethering environment as taught herein, or portions thereof, which can be executed to generate user interface 619 on display 618. For example, system 629 may be one or more components of a replenishment system 300 for implementing one or more processes described herein (e.g., as shown in FIGS. 1-3). Exemplary storage device 624 can also store one or more databases for storing any suitable information required to implement exemplary embodiments. The databases can be updated by a user or automatically at any suitable time to add, delete or update one or more items in the databases. Exemplary storage device 624 can store one or more databases 626 for storing customer information, sales data, product information, replenishment and distribution information, inventory information, sales forecast information, and any other data/information used to implement exemplary embodiments of the systems and methods described herein. Databases 626 may be any one of databases 540, 560, 580 of system 500 shown in FIG. 5.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A method of coordinating product replenishment for multiple stores in response to separately generated replenishment signals from separate store-specific computing systems, the method comprising:

generating, via a first computing system associated with a hub store and in communication with a second computing system associated with a spoke store, a smart system pick file associated with inventory information of the hub store;

retrieving, via the second computing system, data associated with a set of items from a point-of-sale (POS) system disposed at the spoke store;

generating, via the second computing system, a data file including the data retrieved from the POS system disposed at the spoke store;

in response to processing and analyzing the data in the data file, generating, via the second computing system, a scrub file including the data from the data organized by each item of the set of items;

identifying, via the second computing system, a replenishment method for each item of the set of items in the scrub file;

determining, via the second computing system, one or more items from the set of items are replenished by the hub store;

receiving, at the first computing system associated with the hub store, a transmission from the second computing system associated with the spoke store, the transmission including a product replenishment request identifying one or more items of the set of items to be replenished at the spoke store;

generating, by the first computing system at the hub store, a pick list for the spoke store including the one or more items of the set of items based on the transmission received from the second computing system, wherein the transmission includes data of the one or more items in the set of items retrieved from the POS system;

determining, by the first computing system, whether the pick list for the spoke store can be fulfilled by the hub store based on inventory information associated with the hub store included in the smart system pick list;

in response to determining that the pick list cannot be fulfilled by the hub store, aggregating, by the first computing system, the one or more items on the pick list for the spoke store to a replenishment need of the hub store;

transmitting, by the first computing system, the aggregated replenishment need of the hub store and the spoke store to a third computing system associated with a distribution center;

updating the inventory database by the first computing system in response to receipt of product from the distribution center based on the aggregated replenishment need; and outputting, by the first computing system, the pick list for the spoke store from the received product to facilitate fulfillment of the pick list for the spoke store by the hub store.

2. The method of claim 1, wherein the data retrieved from the POS system includes sales data of the one or more items of the set of items and the pick list for the spoke store is automatically generated based on a sales forecast calculated using the sales data of the one or more items of the set of items for the spoke store.

3. The method of claim 2, further comprising:
determining a rate of sale of the one or more items of the set of items based on the sales data; and
calculating the sales forecast of the one or more items of the set of items for the spoke store based on a rate of sale of the one or more items of the set of items for the previous day, an average rate of sale of the one or more items of the set of items over a year, a seasonal need of the item, and a lead time for delivery of the one or more items of the set of items.

4. The method of claim 1, wherein data retrieved from the POS system includes data associated with determining a presentation metric for the spoke store the pick list for the spoke store is generated based on replenishment need of the spoke store and the presentation metric for the spoke store.

5. The method of claim 1, wherein if the pick list can be fulfilled by the hub store, then fulfilling the pick list for the spoke store from shelves of the hub store or backroom storage at the hub store.

6. The method of claim 1, further comprising adjusting an inventory level in the first computing system at the hub store based on fulfilling of the pick list for the spoke store.

7. A system for coordinating product replenishment for multiple stores in response to separately generated replenishment signals from separate store-specific computing systems, the system comprising:
a first computing system at a hub store and in communication with a second computing system, the first computing system configured to:
generate a smart system pick file associated with inventory information of the hub store;
wherein the second computing system is configured to:
retrieve data associated with a set of items from a POS system disposed at the spoke store;
generate a data file including the data retrieved from the POS system disposed at the spoke store;
in response to processing and analyzing the data in the data file, generate a scrub file including the data from the data organized by each item of the set of items;
identify a replenishment method for each item of the set of items in the scrub file;
determine one or more items from the set of items are replenished by the hub store;
wherein the first computing system is configured to:
receive a transmission from the second computing system associated with the spoke store, the transmission including a product replenishment request identifying one or more items of the set of items to be replenished at the spoke store;

generate a pick list for the spoke store including the one or more items of the set of items based on the transmission received from the second computing system, wherein the transmission includes data of the one or more items in the set of items retrieved from the POS system, determine whether the pick list for the spoke store can be fulfilled by the hub store based on inventory information associated with the hub store included in the smart system pick list, in response to determining that the pick list cannot be fulfilled by the hub store, aggregate the one or more items on the pick list for the spoke store to a replenishment need of the hub store, transmit the aggregated replenishment need of the hub store and the spoke store to a third computing system associated with a distribution center, update the inventory database in response to receipt of product from the distribution center based on the aggregated replenishment need; and output the pick list for the spoke store from the received product to facilitate fulfillment of the pick list for the spoke store by the hub store.

8. The system of claim 7, wherein the data retrieved from the POS system includes sales data of the one or more items of the set of items and the pick list for the spoke store is automatically generated based on a sales forecast calculated using the sales data of the one or more items of the set of items for the spoke store.

9. The system of claim 8, wherein the first computing system is further configure to:
determine a rate of sale of the one or more items of the set of items based on the sales data; and
calculate the sales forecast of the one or more items of the set of items for the spoke store based on a rate of sale of the one or more items of the set of items for the previous day, an average rate of sale of the one or more items of the set of items over a year, a seasonal need of the one or more items of the set of items, and a lead time for delivery of the one or more items of the set of items.

10. The system of claim 7, wherein data retrieved from the POS system includes data associated with determining a presentation metric for the spoke store the pick list for the spoke store is generated based on replenishment need of the spoke store and the presentation metric for the spoke store.

11. The system of claim 7, wherein the one or more items of the set of items on the the pick list are disposed on shelves of the hub store or in the backroom storage at the hub store.

12. The system of claim 7, wherein the first computing system is further configured to adjust an inventory level at the hub store based on fulfilling of the pick list for the spoke store.

13. A non-transitory computer readable medium storing instructions executable by a processing device, wherein execution of the instructions causes the processing device to implement a method of coordinating product replenishment for multiple stores in response to separately generated replenishment signals from separate store-specific computing systems, the method comprising:
generating, via a first computing system associated with a hub store and in communication with a second computing system associated with a spoke store, a smart system pick file associated with inventory information of the hub store;

retrieving, via the second computing system, data associated with a set of items from a POS system disposed at the spoke store;

generating, via the second computing system, a data file including the data retrieved from the POS system disposed at the spoke store;

in response to processing and analyzing the data in the data file, generating, via the second computing system, a scrub file including the data from the data organized by each item of the set of items;

identifying, via the second computing system, a replenishment method for each item of the set of items in the scrub file;

determining, via the second computing system, one or more items from the set of items are replenished by the hub store;

receiving, at the first computing system associated with the hub store, a transmission from the second computing system associated with the spoke store, the transmission including a product replenishment request identifying one or more items of the set of items to be replenished at the spoke store;

generating, by the first computing system at the hub store, a pick list for the spoke store including the one or more items of the set of items based on the transmission received from the second computing system, wherein the transmission includes data of the one or more items in the set of items retrieved from the POS system;

determining, by the first computing system, whether the pick list for the spoke store can be fulfilled by the hub store based on inventory information associated with the hub store included in the smart system pick list;

in response to determining that the pick list cannot be fulfilled by the hub store, aggregating, by the first computing system, the one or more items on the pick list for the spoke store to a replenishment need of the hub store;

transmitting, by the first computing system, the aggregated replenishment need of the hub store and the spoke store to a third computing system associated with a distribution center;

updating the inventory database by the first computing system in response to receipt of product from the distribution center based on the aggregated replenishment need; and outputting, by the first computing system, the pick list for the spoke store from the received product to facilitate fulfillment of the pick list for the spoke store by the hub store.

14. The non-transitory computer readable medium of claim 13, wherein the data retrieved from the POS system includes sales data of the one or more items of the set of items and the pick list for the spoke store is automatically generated based on a sales forecast calculated using the sales data of the one or more items of the set of items for the spoke store.

15. The non-transitory computer readable medium of claim 14, further comprising:

determining a rate of sale of the one or more items of the set of items based on the sales data; and calculating the sales forecast of the one or more items of the set of items for the spoke store based on a rate of sale of the one or more items of the set of items for the previous day, an average rate of sale of the one or more items of the set of items over a year, a seasonal need of the item, and a lead time for delivery of the one or more items of the set of items.

16. The non-transitory computer readable medium of claim 13, wherein data retrieved from the POS system includes data associated with determining a presentation metric for the spoke store the pick list for the spoke store is generated based on replenishment need of the spoke store and the presentation metric for the spoke store.

17. The non-transitory computer readable medium of claim 13, wherein the one or more items of the set of items on the the pick list are disposed on shelves of the hub store or in the backroom storage at the hub store.

* * * * *